United States Patent [19]

Rangarajan et al.

[11] Patent Number: 5,845,081

[45] Date of Patent: Dec. 1, 1998

[54] USING OBJECTS TO DISCOVER NETWORK INFORMATION ABOUT A REMOTE NETWORK HAVING A DIFFERENT NETWORK PROTOCOL

[75] Inventors: Govindarajan Rangarajan, Sunnyvale; Chaoying Huo, Redwood City, both of Calif.

[73] Assignee: Sun Microsystems, Inc., Mountain View, Calif.

[21] Appl. No.: 707,318

[22] Filed: Sep. 3, 1996

[51] Int. Cl.[6] ................................................. G06F 13/00
[52] U.S. Cl. ................................ 395/200.54; 270/258
[58] Field of Search .................................. 395/650, 700, 395/726, 614, 676, 200.53, 200.54, 200.56, 200.57, 200.55; 370/258

[56] References Cited

U.S. PATENT DOCUMENTS

| | | | |
|---|---|---|---|
| 5,185,830 | 2/1993 | Wu | 395/200 |
| 5,185,860 | 2/1993 | Wu | 395/200 |
| 5,293,693 | 3/1994 | Fauld, Jr. et al. | 395/200.54 |
| 5,457,683 | 10/1995 | Robins | 370/258 |
| 5,511,208 | 4/1996 | Boyles et al. | 395/200.53 |
| 5,515,508 | 5/1996 | Pettus et al. | 395/200.01 |
| 5,537,717 | 7/1996 | Sharma et al. | 370/94.1 |
| 5,572,640 | 11/1996 | Schettler | 345/440 |
| 5,590,124 | 12/1996 | Robins | 370/258 |
| 5,649,091 | 7/1997 | Ould-Ali et al. | 395/182.09 |
| 5,710,885 | 1/1998 | Bondi | 395/200.54 |

*Primary Examiner*—Frank J. Asta
*Assistant Examiner*—Ivan C. Pierce, III
*Attorney, Agent, or Firm*—Joseph Yang; Skadden, Arps

[57] ABSTRACT

The present invention is a method, apparatus and computer program product for discovering the nodes and other network information of a computer network (the target network) from a device or node that is not part of the target network (the discovery node) when the discovery node uses a different network protocol than the target network. The invention involves identifying one or more additional nodes (the target nodes) that have access to network information about the target network and with whom the discovery node can communicate. This target network information can include the identification of nodes which are present on the network, the topology of the network, the services provided by the network or by the nodes on the network, status information as the network changes such as information about network and node events or alarms, etc. The discovery node may also have stored information on the types of nodes, services, and other information which may be found on a network using the network protocol of the target network. The discovery node can use the target nodes to receive target network information in various ways, including requesting information from a target node, invoking target network functionality at a target node or target network node to identify target network information, and accessing target network information previously stored at a target node or target network node. After receiving target network information, the discovery node models it using software objects that are created by the discovery node. These software objects are discovery node representations of target network nodes and objects. The discovery node makes the created objects available as representations of the network information from the target network, and can maintain the accuracy of the represented target network information over time.

25 Claims, 11 Drawing Sheets

USING OBJECTS TO DISCOVER NETWORK INFORMATION ABOUT A REMOTE NETWORK HAVING A DIFFERENT NETWORK PROTOCOL

BACKGROUND OF THE INVENTION

The present invention relates generally to the field of computer network communication and more particularly to the management of multiple computer networks employing different network protocols.

Computer networks allow multiple computers, peripherals and other information storage, retrieval or processing devices to share data. Each device attached to a network is typically referred to as a node on the network, or a node that is part of the network. If a physical connection exists from a first node to a second node, then the second node is said to be accessible to the first node. If the first node is able to send data to the second node, then the first node is said to be able to contact the second node, and the second node is contactable from the first node. If the first node is further able to share data with the second node such that the second node can understand the data, then the first node is said to be able to communicate with the second node.

Thus, in order for two nodes to be able to communicate, a physical connection between the nodes must first exist. The physical connection between the nodes can be implemented using various media, including cables or wireless communication, and can use various types of signals, including electrical voltages, optical, radio waves, etc. In order for two nodes to communicate and share data, the nodes must use the same network protocol, or have an intermediary translate between disparate protocols. A network protocol provides the mechanisms that allow communication between nodes to take place, including directing the communicated data to the correct destination, providing error-checking so that the data arrives intact, and providing standard formatting for communicated data so that a destination node can understand the data. To facilitate communication, a network protocol will typically use a lower-level data-link protocol, which serves to control the actual flow of data between two nodes. Various network protocols have been developed, including Transmission Control Protocol (TCP), Internet Protocol (IP), Internet Packet Exchange (IPX), Systems Network Architecture (SNA), Datagram Delivery Protocol (DDP), etc. Various data-link protocols have also been developed, including Ethernet, Token Ring, Fiber Distributed Data Interface (FDDI), etc.

All the nodes attached to a particular physical communication medium, such as a specific coaxial cable, will typically use the same network protocol, and for a network protocol named XYZ, those nodes and media would be referred to as an XYZ protocol network, or merely an XYZ network. If a physical communication medium included nodes that used multiple network protocols, only those nodes using the same network protocol would be referred to as a network. For example, if a coaxial cable had multiple nodes attached to it, with some nodes using the XYZ network protocol and other nodes using the TUV network protocol, the nodes using the XYZ network protocol would be referred to as an XYZ network and the nodes using the TUV network protocol would be referred to as a TUV network. Network protocols are the basis of the logical grouping of nodes into networks because nodes using the same network protocol can communicate and share data, while two nodes that are physically connected but use different network protocols typically cannot communicate and share data. As mentioned above, a network protocol provides standard formatting for communicated data so that a destination node can understand the data it receives. Since different network protocols typically use different standard formatting, a node using one network protocol would not understand the formatting of communicated data from a node using a different network protocol. Many network protocols package the data to be transferred into discrete packets that move across the network, and use a defined packet structure so that the receiving node can unpackage and thereby understand the information in a data packet. Even if two different network protocols both use data packets for communication, they typically will use different packet structures-thus, even if a node receives a packet from a node using another network protocol, the receiving node will not be able to unpackage the information in the data packet to enable the sharing of the data.

As communication between computers has become increasingly pervasive and important, the number and size of computer networks have correspondingly increased. If a particular node on a network is aware of the presence of another node on the network, then typically the network protocol common to the nodes will make communication possible from the first node to the second node. However, if the presence of a node on the network is not known, it typically will not be contactable, even if the nodes share a physical connection and common network protocol. It is often difficult for a node to discover, i.e. ascertain, the other nodes that are part of the network. This problem is exacerbated by the increasing size of networks, by networks with nodes that are physically remote from other nodes, and by the dynamic nature of computer networks whereby new nodes can be purposefully added or removed at any time and problems with physical connections or the nodes themselves will commonly cause unexpected removal of nodes from the network. Nonetheless, some existing systems have been implemented which can discover the other nodes that are part of a network if all of the nodes use the same network protocol.

Not only does this problem of discovering the presence and status of other nodes on the network impact the average user at a node, who may not be aware of which other computers are contactable for communication, but it is a significant problem for those whose job includes the task of managing a network of computers. The manager must be able to determine what nodes are accessible and contactable so that network problems such as lack of connectivity are recognized. Moreover, the management of a network typically includes not only maintaining the connections between nodes, but also providing specialized computer services such as file services, print services, network security services, workgroup productivity services, etc. Typically, these services are available to multiple nodes on the network, and are referred to as network services. It is crucial for a computer network manager to be able to assess the status of all of the network nodes, many of which may not be physically present at the location of the manager. Status information can be reflected in network and node events, including alarms. Ideally, a manager will have the additional ability to alter the status of one or more nodes from the manager's location, including responding to alarms and other problems.

In addition to the growth in size of individual computer networks, they are increasingly becoming interconnected. One method of connecting two or more networks involves the existence of at least one common node which is on, and part of, both networks. In this situation, nodes which are common to more than one network may serve as routers, bridges or gateways, passing data between the networks and thus enabling a node on one network to communicate with a node on another network. While each network will only use a particular network protocol, the various networks in a group of interconnected networks may use heterogeneous network protocols. If two networks use different network protocols, a common node may also have the task of converting data from the protocol format of one network to the protocol format of the other.

A common situation involves interconnected networks in which both the IP network protocol and the IPX network protocol are in use by individual networks. IP, as part of TCP/IP, has evolved into the most pervasive protocol in use on the Internet. While IP historically was used primarily by high-end workstations, it is designed to be hardware independent and has been implemented for a wide variety of devices. IPX is part of the NetWare® protocol that was developed by Novell, Inc., and was traditionally used by personal computers (PCs) based on Intel® 80X86 chips. As such, IPX became the most prevalent network protocol among networks of Intel-based PCs. As the technical distinctions between different types of computers continue to blur, it has become increasingly common to have interconnected computers of various different types, and thus it is common to have interconnected networks in which both the IP protocol and the IPX protocol are in use. Additionally, both IPX and IP have been implemented on top of multiple data-link protocols, such as Ethernet and Token Ring. While both IP and IPX route packets of data, their packet structures are different, and thus an IP packet would not be understood by a receiving node using IPX, nor would an IPX packet be understood by a receiving node using IP. Due to these differences, the IP and IPX protocols are not compatible.

The existence of interconnected networks, particularly when the networks use different network protocols, only increases the difficulty of ascertaining the presence and status of other nodes with which a particular node can communicate. For instance, a node on an IP protocol network, referred to as an IP node, can typically discover information about many contactable IP nodes by using standard IP discovery mechanisms such as Packet Internet Groper (PING) (checks if a known node is contactable on the network), Address Resolution Protocol (ARP) (request a translation, often from another node, from the unique logical address of a known node to a physical address), Reverse Address Resolution Protocol (RARP) (request a translation, often from another node, from the physical address of a known node, often itself, to its unique logical address), routing tables (a node obtains addresses of other nodes from destination information in transmitted messages that have passed by or through it), etc. An IPX node, which is a node on an IPX protocol network, can also typically discover information about other contactable IPX nodes by using standard IPX discovery mechanisms such as Echo (checks if a known node is contactable on the network), Service Advertising Protocol (SAP) (allows IPX nodes to advertise their services to other IPX nodes), etc. However, IP protocol-specific discovery mechanisms do not work on an IPX protocol network because the IPX protocols and IP protocols are not compatible. Even if an IPX node is given access to a database of network information for its IPX protocol network, a node that is only on an IP protocol network may not be able to discover this information due to the differences in protocols. Note that while access to information may occur from another node on a network, access to information is distinct from the physical accessibility of one node to another on networks. Ideally, a node on one network should be able to ascertain not only the other nodes with which it can communicate, wherever they may be located, but also the topology of the nodes, any services provided by nodes or networks, and other status information available from any of the interconnected networks and their nodes. Unfortunately, there is no general solution at this time to the problem of ascertaining the presence and status of other nodes with which a particular node can communicate or the network information for other networks, when there are interconnected networks which use different network protocols.

SUMMARY OF THE INVENTION

The present invention is a method, apparatus and computer program product for discovering the nodes and other network information of a computer network (the target network) from a device or node that is not part of the target network (the discovery node), particularly when the discovery node uses a different network protocol than the target network. The invention involves identifying one or more additional nodes (the target nodes) that have access to network information about the target network and with whom the discovery node can communicate. The discovery node uses these target nodes to receive target network information, and models that information using software objects that are created by the discovery node. Finally, the discovery node makes the created objects available as representations of the network information from the target network, and can maintain the accuracy of the represented target network information over time.

The receipt of target network information can occur in several different ways. In the preferred embodiment of the invention, the discovery node contacts a target node and requests specific information about the target network from the target node. In another embodiment, the discovery node can use its knowledge of the presence of a target node, combined with stored information specific to the network protocol of the target network, to discover network information accessible from the target node about the target network without requesting the information from the target node.

The discovered target network information can include the identification of nodes which are present on the network, the topology of the network, the services provided by the network or by the nodes on the network, status information as the network changes such as information about events or alarms, etc. The discovery node also holds stored information on the types of nodes, services, and other information which may be found on a network using the network protocol of the target network. When the target network information is received, it is modeled by the discovery node using logical abstractions based on the stored type information. The logical abstractions are objects created by the discovery node that may correspond to one or more physical or logical entities on the target network. The objects share a common format with created objects which represent network information for networks with the same network protocol as the discovery node, and the common format allows the objects to interoperate. However, the format of the objects created for the target network information is also specific to the network protocol of the target network, and thus can be used to indicate that the network information is from a network remote from the discovery node. Finally, the created objects are stored so that the discovery node can access the objects and their object information.

After the network information is received and modeled, it can be displayed to a user at the discovery node or made accessible to application programs and other nodes contactable from the discovery node. The information that is made available corresponds to the logical abstractions of the created objects, rather than the entities on the target network. Moreover, the discovery node can also request or discover additional information in such a manner that the action occurs automatically under specified conditions, which allows the discovery node to remain apprised of any changes in network information on the target network. This network information discovery process can occur for as many networks as are part of the interconnected group of networks or as many target nodes that are identified. The network information from all of the discovered networks can be combined to represent all of the nodes, services, and other information which are available to the discovery node.

BRIEF DESCRIPTION OF THE DRAWINGS

The objects, features and advantages of the present invention will be made apparent in the following detailed description in which.

DETAILED DESCRIPTION OF THE INVENTION

Figure 1:
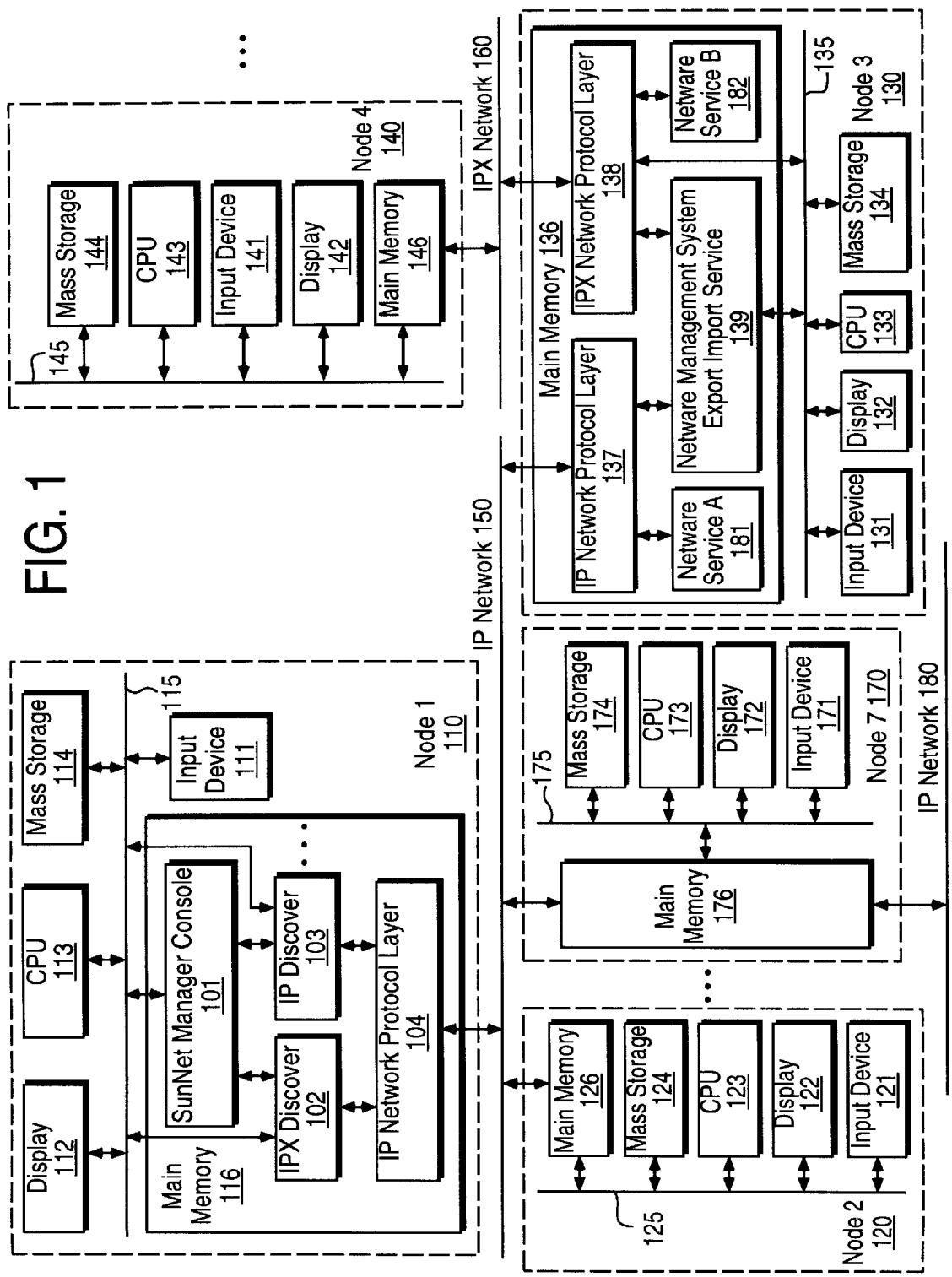
FIG. 1 illustrates a physical diagram of a typical interconnected computer network in accordance with the present invention.

A method, apparatus, and computer program product are described for discovering the nodes and other network information of a computer network (the target network) from a device or node that is not part of the target network (the discovery node), particularly when the discovery node uses a different network protocol than the target network. The discovery of the network information involves one or more additional nodes (target nodes) that have access to network information about the target network, and with whom the discovery node can communicate.

The preferred embodiment has several features, including the following: the discovery node is also part of a network, referred to as the discovery network, and the target network and discovery network are part of the same interconnected group of networks; the target node uses both the network protocol of the target network and the network protocol of the discovery node; the target node is part of at least two networks, with one of these networks using the target network protocol and another of these networks using the discovery node protocol—in the simplest example, the target node is part of both the discovery network and the target network; communication between the discovery node and target node occurs over the discovery network, and over other networks in the interconnected group if necessary; and the target node provides a network management information service that supplies target network information upon request. Those skilled in the art will appreciate that alternate embodiments can be obtained by varying one or more of these features—for example, the discovery node could obtain the target network information without requesting the information from a network management information service at a target node. In addition, specific alternate embodiments will be described throughout the description below.

Throughout this detailed description, numerous specific details are also set forth such as specific network protocols and specific mechanisms to gather, receive and distribute network information. Those of ordinary skill in the art will appreciate that the present invention may be practiced without such specific details. In particular, the example embodiment illustrated in FIGS. 1–11 describes the discovery of network information for a target IPX network from a discovery IP node—however, the present invention is not limited to the details used in the example embodiment such as networks using the IP and IPX network protocols, and functionalities or formats provided by NetWare components from Novell, Inc. (such as NXIS) or SunNet Manager components from Sun Microsystems (such as SNM).

Thus, while the present invention will be discussed in relation to the interconnected computer network of FIG. 1, those skilled in the art will appreciate that the present invention is not limited to the physical constraints of the illustrated network: the target node and discovery node do not have to be part of the same network, or even part of the same interconnected network; the target node does not have to be part of the target network; the network protocols in use do not have to be IP and IPX, nor is an interconnected group of networks limited to two network protocols; the components are not limited to services or functionality from NetWare or SunNet Manager; the target node does not have to have a network management information service; etc.

FIG. 1 shows a physical linkage diagram of a typical interconnected computer network which may incorporate the present invention. The illustrated interconnected computer network includes five network nodes 110, 120, 130, 140 and 170 and three computer networks 150, 160 and 180. Network nodes 110, 120, 130 and 170 are nodes that comprise the network 150, which uses the IP network protocol. Network nodes 130 and 140 are nodes that comprise the network 160, which uses the IPX network protocol. Network node 170 is a node that comprises the network 180, which uses the IP network protocol. Those skilled in the art will appreciate that additional nodes and networks are possible, and that the computer networks may be implemented using a variety of physical media. Networks such as 180 that use the IP network protocol are referred to as IP networks. Networks such as 160 that use the IPX network protocol are referred to as IPX networks. In FIG. 1, Node 110 is illustrated as an example of a discovery node, network 150 is illustrated as an example of a discovery network, network 160 is illustrated as an example of a target network, and node 130 is illustrated as a target node.

Each network node is shown as a general purpose computer. Node 110 illustrates the six basic node components which each illustrated node contains: an input device 111, a display 112, a CPU 113, a mass storage 114, an internal bus 115, and a main memory 116. Those skilled in the art will appreciate that a node on a network may contain variations of these components, including more or less components. For example, a printer node may consist of only a CPU and a display, where the display is the printed output. Alternately, a node may contain additional components such as secondary memory or a communications device such as a modem. In addition, multiple instantiations of each component type may be present in a network node. For example, a network node may contain multiple CPUs, multiple input devices including a keyboard, a mouse, and a scanner, and multiple types of mass storage including a hard drive, a floppy drive, a Digital Video Disk (DVD), a CD-Recordable device, a magneto-optical drive, etc. A network node may also have multiple internal buses, some of which may possess slots for removable bus cards which provide various functionality. The other four illustrated nodes also consist of the six basic described node components, and nodes 120, 140 and 170 will not be described in detail here. Those skilled in the art will appreciate that while only the main memorys, such as main memory 116, are shown exchanging data with the networks, such as IP network 150, other components in a network node, such as mass storage 114, may exchange data directly with a network without the intervention of main memory.

In discovery node 110, the main memory 116 is illustrated having various main memory components such as a SunNet Manager console 101, an IPX discover 102, an IP discover 103 and an IP network protocol layer 104. The IP network protocol layer 104 allows the node 110 to use the IP network protocol to communicate with other nodes which use the IP network protocol, such as nodes on IP network 150 and IP network 180. Each node which can communicate with other nodes will typically have at least one network protocol layer. The IP discover 103 provides a mechanism for discovering network information about networks using the IP network protocol. The IPX discover 102 provides a mechanism for discovering network information about networks using the IPX network protocol. As illustrated in the main memory 116, additional discover mechanisms can be present that would discover network information about networks using other network protocols. The SunNet Manager console 101 receives network information from all of the discover mechanisms, and can make this information available to other components or other nodes. Those skilled in the art will appreciate that the network information could be displayed to a user, transmitted to an application program on node 110 or on another node, stored in mass storage 114 or other mass storage, including a database (not shown), etc. As described earlier, various mechanisms exist to perform the IP discover functionality from an IP network node, such as PING, ARP, RARP, routing tables, etc.

In target node 130, the main memory 136 is illustrated having an IP network protocol layer 137, an IPX network protocol layer 138, a NetWare service A 181, a NetWare service B 182 and a NetWare Management System™ export import service 139. The IP network protocol layer 137 allows the node 130 to use the IP network protocol to communicate with other nodes which use the IP network protocol, such as nodes on IP network 150 and IP network 180. The IPX network protocol layer 138 allows the node 130 to use the IPX network protocol to communicate with other nodes which use the IPX network protocol, such as nodes on IPX network 160. The NetWare service A 181 communicates with the IP network protocol layer 137 to provide a network service A to nodes using the IP protocol. While communication between components on the same node typically involves sharing data, a network protocol is not typically necessary for this type of inter-component communication. The NetWare service B 182 communicates with the IPX network protocol layer 138 to provide a network service B to nodes using the IPX protocol. Those skilled in the art will appreciate that multiple network services may be made available by a node to a given network, and that the network services made available are not limited to NetWare services.

The NetWare Management System export import service 139, referred to as an NXIS, is an example of a network management information service for IPX networks that can provide available network information upon request. IPX network information can be received by the IPX network protocol layer 138 at node 130, and this IPX network information could be entered directly into mass storage 134 via internal bus 135. NXIS 139 can communicate with either mass storage 134 via internal bus 135 or the IPX network protocol layer 138 to access IPX network information, and can make this IPX network information available to IPX discover 102 using IP network protocol layer 137 and IP network 150. The network information can include the identification of nodes which are part of the network, the topology of the network, the services provided by the network or by the nodes on the network, status information as the network changes including information about events or alarms, etc.

Figure 2:
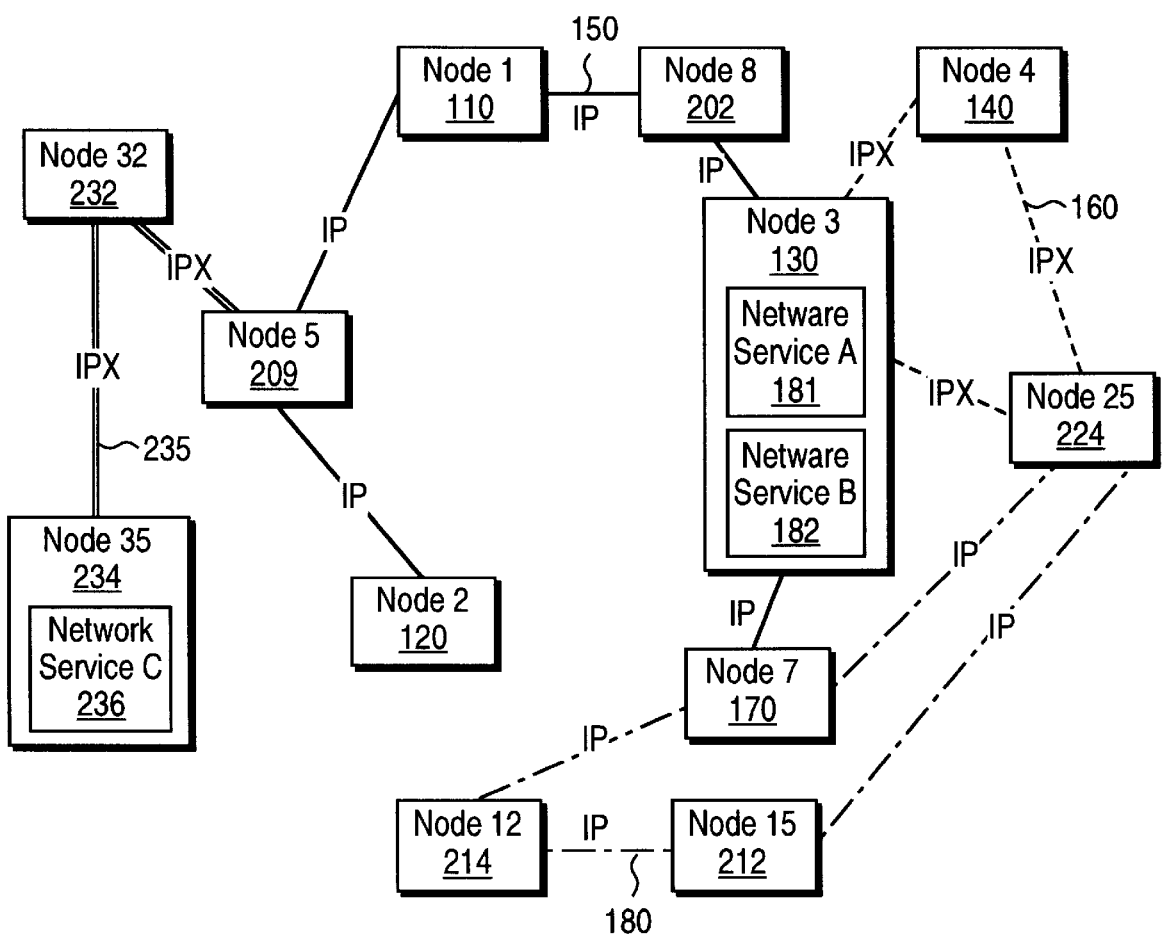
FIG. 2 illustrates a logical diagram showing four interconnected networks of computers, where two of the networks are using an IP network protocol and two of the networks are using an IPX network protocol.

In FIG. 2, a functional topology of the interconnected computer network of FIG. 1 is illustrated. It should be noted that the interconnected network illustrated in FIG. 2 includes the nodes and networks illustrated in FIG. 1, but is not limited to those nodes and networks. FIG. 2 illustrates twelve nodes 110, 120, 130, 140, 170, 202, 209, 212, 214, 224, 232, and 234 and four computer networks 150, 160, 180 and 235. Network nodes 209, 232 and 234 are nodes that comprise the network 235, which uses the IPX network protocol. Network nodes 110, 120, 130, 170, 202, and 209 are nodes that comprise the network 150, which uses the IP network protocol. Network nodes 170, 212, 214, and 224 are nodes that comprise the network 180, which uses the IP network protocol. Network nodes 130, 140 and 224 are nodes that comprise the network 160, which uses the IPX network protocol. It should also be noted that no particular network topology is required: networks 150 and 235 have a bus topology, while networks 160 and 180 have a ring topology. Those skilled in the art will appreciate that other network topologies may also be used. Node 130 provides NetWare service A 181 and NetWare service B 182. Node 234 provides network service C 236.

Figure 3:
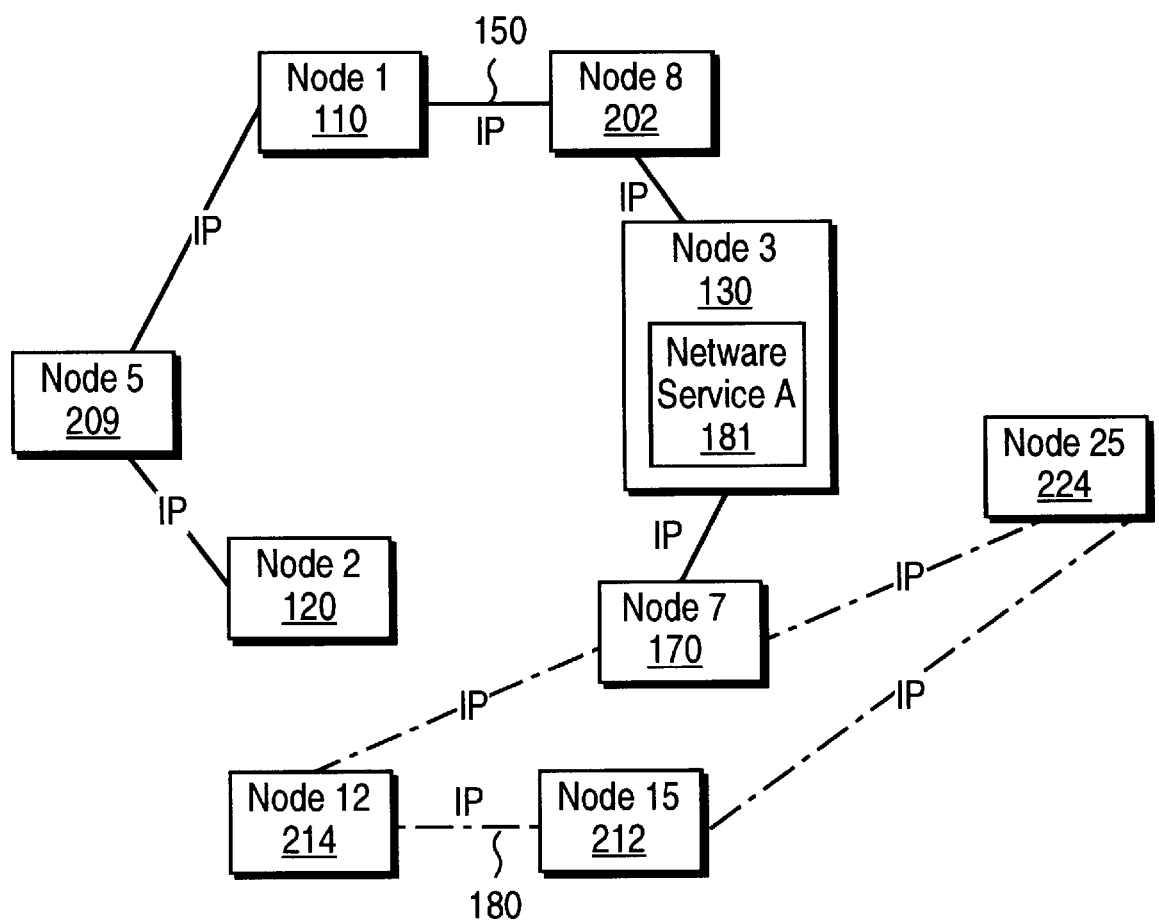
FIG. 3 illustrates the portions of the interconnected networks of FIG. 2 which are detectable from Node 1 under prior art systems.

FIG. 3 illustrates the functional topology of the interconnected computer network of FIG. 2 that would typically be discoverable by discovery node 110 under prior art systems. Nodes 120, 130, 170, 202 and 209 that are part of network 150, and nodes 212, 214 and 224 that are part of network 180 would be discoverable from node 110 because networks 150 and 180 use the IP network protocol, which is also in use by node 110. While NetWare service A 181 may be discoverable by node 110 in a prior art system because service A is made available to nodes on IP networks, NetWare service B 182 would not typically be discoverable by node 110 in a prior art system because service B is made available only to nodes on IPX networks. In addition, nodes 140, 232 and 234 will typically not be discoverable from node 110 in a prior art system because these nodes are not part of networks that use the IP network protocol, which is in use by node 110. Finally, while node 224 was discoverable because it was part of IP network 180, the fact that node 224 is also part of IPX network 160 and thus directly connected to node 130 will typically not be discoverable.

Those skilled in the art will appreciate that an undiscoverable network node on an IPX network, such as node 140, could additionally be part of another IP network not shown in FIG. 2 or FIG. 3. This additional IP network would presumably included additional nodes which are also not shown in FIG. 2 or FIG. 3. The only physical connections between this additional IP network and the interconnected networks shown in FIG. 3 could be through an intermediate network that did not use the IP network protocol, such as IPX network 160. In this case, node 140 and the additional nodes on the additional IP network would not typically be discoverable by node 110 under prior art systems, even though the additional network also uses the IP network and would be part of the interconnected networks shown in FIG. 2. This result occurs because the IP discover 103 component illustrated in FIG. 1 would not typically be able to discover nodes on an IP network if that network was only reachable from node 110 through an intermediate network that did not use the IP network protocol, such as IPX network 160.

Figure 4:
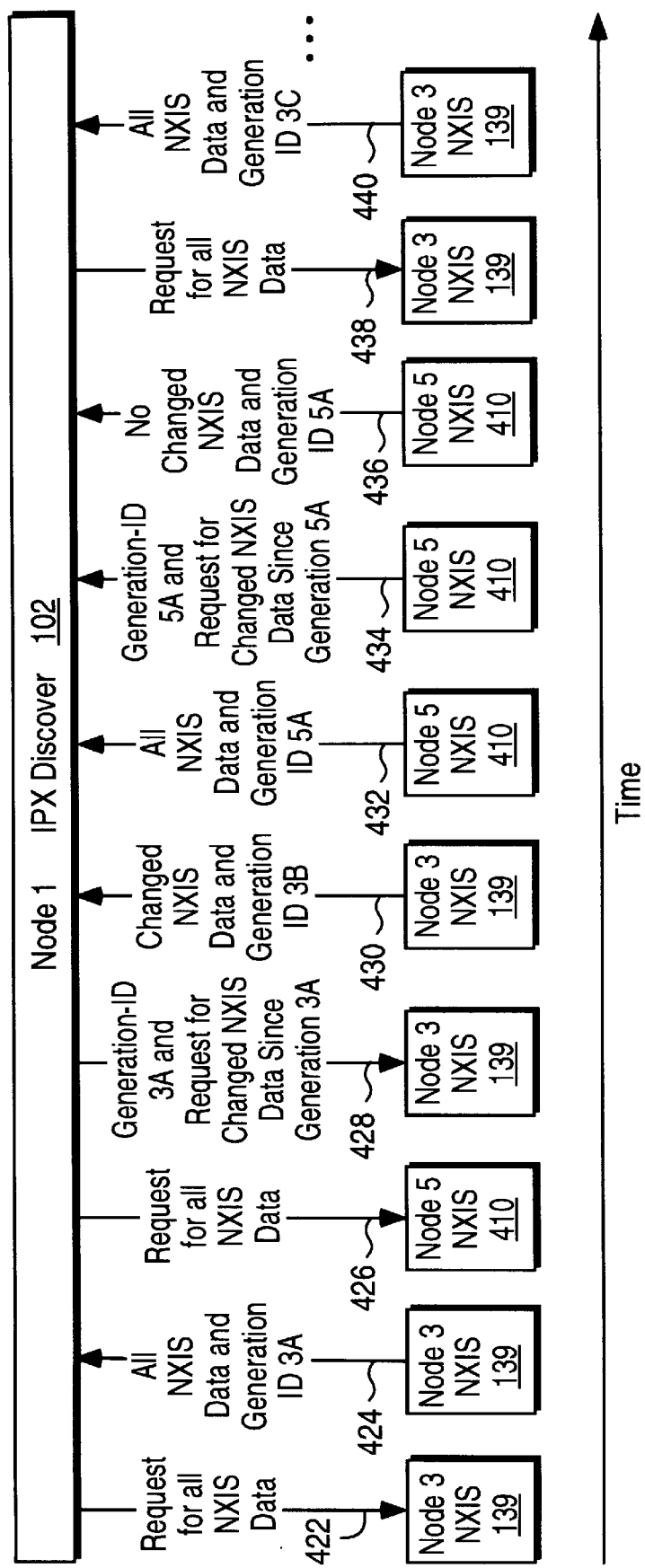
FIG. 4 illustrates logical communication exchanges for discovery of IPX protocol networks from a node on an IP protocol network.

FIG. 4 illustrates logical communication exchanges in which an IPX discover component discovers network information by requesting the information from network management information services on target nodes. FIG. 4 illustrates three components: IPX discover 102 which resides at node 1 (labeled node 110 in FIG. 2); NXIS 139 which resides at node 3 (labeled node 130 in FIG. 2); and NXIS 410 which resides at node 5 (labeled node 209 in FIG. 2). Components NXIS 139 and NXIS 410 are each shown multiple times in FIG. 4. FIG. 4 also illustrates ten node-to-node communications 422, 424, 426, 428, 430, 432, 434, 436, 438 and 440. In the illustrated example, the node-to-node communications occur over the IP network 150 (not shown in FIG. 4), and occur over time such that the left-most communication 422 is the earliest communication and the right-most communication 440 is the latest communication. As illustrated in FIG. 4, additional communications can occur, and those skilled in the art will appreciate that numerous variations could occur in the communication sequence, including the following: communications could occur with additional NXIS components; NXIS components could reside at nodes not part of network 150, such as node 224 in FIG. 2; communications could occur other than over network 150, such as a temporary connection via modem or through a router connection to another network; communications could be synchronous such that the sender of a message waits until a reply is received before taking any other action; the communications could occur with a network management information service other than an NXIS; etc.

IPX discover 102 begins the discovery process by sending communication 422 to NXIS 139 which requests all NXIS data which NXIS 139 can access. Since NXIS 139 resides on node 130 which is part of IPX network 160, illustrated in FIG. 2, NXIS 139 may have access to NXIS data which includes IPX network information for network 160. This network information may include the following: node identification information for node 140 and node 224; network topology for network 160; network services offered for network 160, including NetWare service B 182; network 160 status information such as events or alarms, etc. At some time after receiving communication 422, NXIS 139 sends communication 424 to IPX discover 102 which includes generation ID 3A and all NXIS data to which NXIS 139 has access. Generation ID 3A indicates the state of the NXIS data, such as a time-stamp or a database ID corresponding to the state of a database. Those skilled in the art will appreciate that an NXIS may acquire NXIS data in numerous ways, including searching an IPX network such as network 160 in response to a communication, retrieving previously stored data from a database, requesting the data from another node, etc. Some network services or nodes store network information in databases which are accessible from nodes on the network, such as the NetWare Management System which stores IPX network information in the NetWare Management System database.

At some time after receiving communication 424, IPX discover 102 continues the discovery process by sending communication 426 to NXIS 410 which requests all NXIS data which NXIS 410 can access. Since NXIS 410 resides on node 209 which is part of IPX network 235, illustrated in FIG. 2, NXIS 410 may have access to NXIS data which includes IPX network information for network 235. This network information may include the following: node identification information for node 232 and node 234; network topology for network 235; network services for network 235, including NetWare service C 236; network 235 status information such as events or alarms, etc.

Before receiving a response to communication 426, IPX discover 102 continues the discovery process by sending communication 428 to NXIS 139, which includes generation ID 3A and a request for all NXIS data which has changed since the generation ID of the NXIS 139 data was 3A. As described earlier, generation ID 3A indicates the state of the NXIS data that IPX discover 102 had earlier received from NXIS 139 in communication 424.

At some time after receiving communication 428, NXIS 139 responds by sending communication 430 to IPX discover 102 which includes generation ID 3B and all NXIS data which has changed since the generation ID of NXIS 139 data was 3A. Those skilled in the art will appreciate that if no data has changed, communication 430 would have no changed data. In this situation, generation ID 3B may be the same as generation ID 3A because the data has not changed, for example a database ID that changes only when the data changes, or generation ID 3B may be different from generation ID 3A, for example a generation ID that is based upon the time that the communication is made.

At some time after receiving communication 426 and after NXIS 139 sends communication 430, NXIS 410 responds to communication 426 by sending communication 432 to IPX discover 102, which includes generation ID 5A and all NXIS data to which NXIS 410 has access. As described above, NXIS 410 will typically have access to IPX network information for network 235. If NXIS 410 attempts to send communication 432 very shortly after NXIS 139 sends communication 430, it is possible that a collision between the communications could take place if IPX discover 102 can only receive one communication at a time, or if the communication media, such as network 150, can only carry one communication at a time. If the communication media is network 150, then the network protocol, in this case IP, may coordinate the communications to ensure their receipt. Alternately, IPX discover 102, the NXIS components 139 and 410, or some other component may act to ensure that the communications are received. Those skilled in the art will appreciate that it is also possible that a communication may be lost or contain an error which prevents the communication from being understood, which may cause the retransmittal of the communication, or the loss of the communication if no retransmittal occurs.

At some time after receiving communication 432, IPX discover 102 continues the discovery process by sending communication 434 to NXIS 410 which includes generation ID 5A and a request for all NXIS data which has changed since the generation ID of the NXIS 410 data was 5A. At some time after receiving communication 434, NXIS 410 responds to communication 434 by sending communication 436 to IPX discover 102 which includes generation ID 5A and no changed NXIS data. Communication 436 from NXIS 410 returns the same generation ID 5A as NXIS 410 received in communication 434 because no data has changed.

At some time after receiving communication 436, IPX discover 102 continues the discovery process by sending communication 438 to NXIS 139, which requests all NXIS data which NXIS 139 can access. At some time after receiving communication 438, NXIS 139 responds to communication 438 by sending communication 440 to IPX discover 102 which includes generation ID 3C and all NXIS data to which NXIS 139 has access. Although all NXIS data was requested, those skilled in the art will appreciate that if the NXIS data has not changed since the NXIS data send in communication 430 with generation ID 3B, the generation ID 3C sent in communication 440 may be the same as generation ID 3B. Additionally, those skilled in the art will appreciate that in alternate embodiments, requests for data other than the initial request from a node, such as communication 438, could be restricted to changed information rather than all information available.

Figure 5:
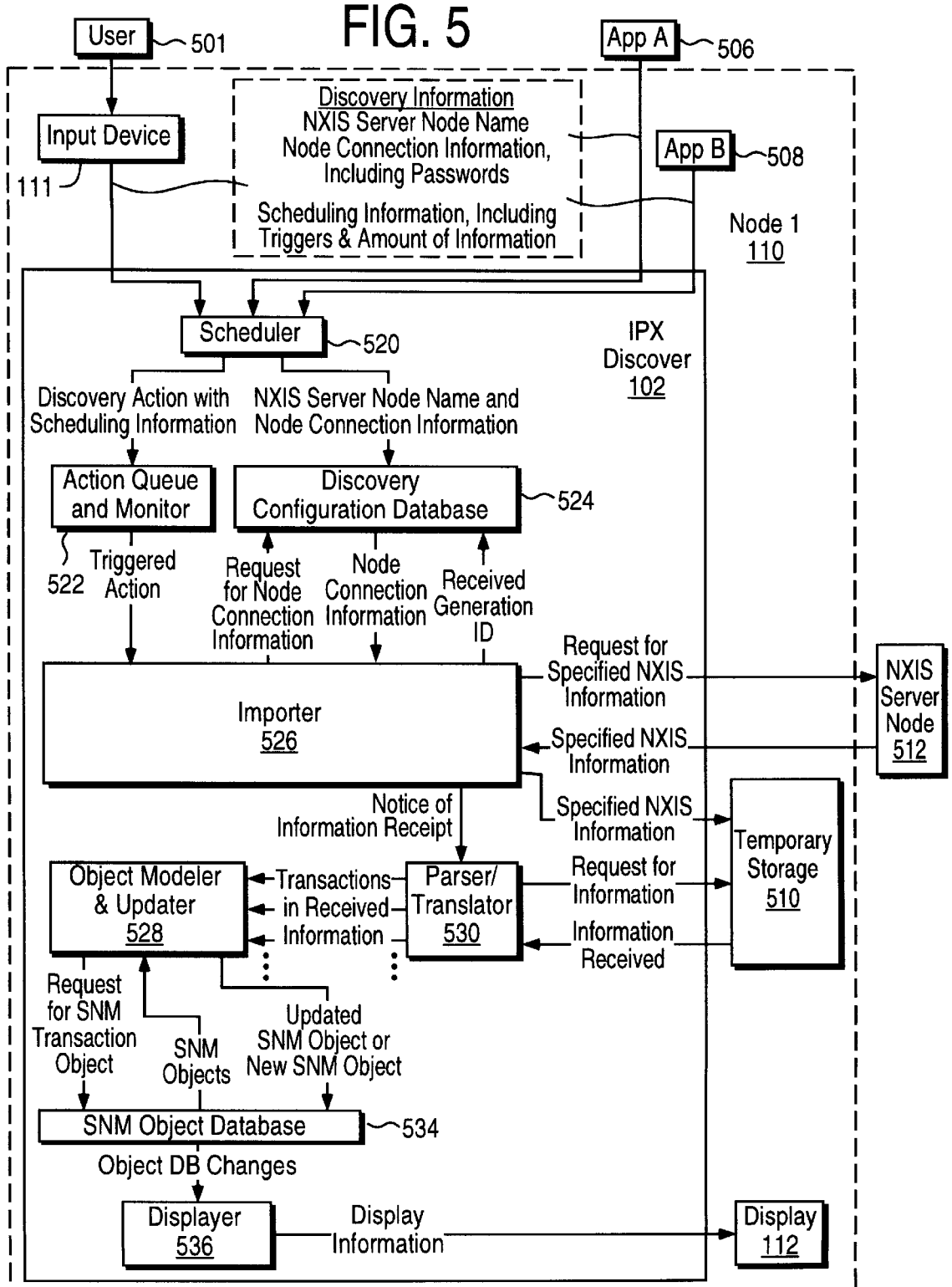
FIG. 5 illustrates a detailed block diagram of one of the nodes on an IP protocol network in the system of FIG. 1.

FIG. 5 illustrates a more detailed block diagram of the IPX discover 102 main memory component that includes the flow of information for the subcomponents within the IPX discover 102 component. The IPX discover 102 component is an example of a target network protocol discovery component, and some of the information in FIG. 5 is specific to IPX discovery. In describing FIG. 5, the preferred embodiment will be described in general terms, indicating when necessary which IPX-specific aspect of FIG. 5 is being described.

FIG. 5 illustrates node 110, a user 501 at node 110, an application program App A 506 that is executing somewhere outside of node 110, and a target network node with which node 110 can communicate and which has a network management information system (here NXIS Server Node 512, with an NXIS component). Illustrated node 110 components include input device 111, a target network protocol discovery component (here IPX discover 102), application program App B 508, temporary storage 510, and display 112. While some node 110 components illustrated in FIG. 1 are not illustrated in FIG. 5, such as CPU 113, mass storage 114, internal bus 115 and main memory 116, they are still present: application program App B 508 may be executing inside of main memory 116, the application's executable code may be stored on mass storage 114, and the execution of App B 508 will require the use of CPU 113; temporary storage 510 may reside in main memory 116 or mass storage 114; IPX discover 102 is residing inside main memory 116; and information flow between components, illustrated by arrows indicating direction of information flow, may occur on internal bus 115. FIG. 5 also illustrates the typical subcomponents of a target network protocol discovery component (here IPX discover 102) including scheduler 520, action queue and monitor 522, discovery configuration database 524, importer 526, object modeler and updater 528, parser/translator 530, a discovery node object database (here SNM object database 534) and displayer 536, as well as numerous information flows. Those skilled in the art will appreciate that some or all of the subcomponents shown could be joined together into a smaller number of subcomponents that combine the functionalities of the joined subcomponents, or that some or all of the subcomponents shown could be further divided into additional subcomponents that split the functionalities of the divided subcomponents.

In the preferred embodiment of the invention, the target network protocol discovery component (here IPX discover 102) receives discovery information from a source external to itself. The discovery information directs the discovery component to discover the network information of a target network. The discovery information may contain several pieces of information, including the following: the name of a target node with a network management information service (here NXIS Server Node Name); Node Connection Information, which is information that the discovery component will use to communicate with the target node; and Scheduling Information, which is information that details how the discovering of the target network will take place. Those skilled in the art will appreciate that the discovery information could be transmitted to the discovery component from a variety of sources external to it, including from a user at the discovery node or at another node through an input device, from an application program executing at the discovery node or at another node, from A combination of external sources, etc. In the implemented embodiment, discovery information is transmitted to the discovery component from a user.

Node Connection Information can include not only information such as the network address of the target node, which facilitates contact and communication with the target node, but also information such as passwords, identification or keys that are necessary for the target node and its network management information system to respond to communications from the discovery component. Scheduling Information can include information such as triggering information which indicates the conditions under which the discovering actions of the discovery component will occur, such as at a specified future time, at periodic time intervals, upon discovery node reboot, upon the discovery node object database reaching a specified level of completeness, etc. In the implemented embodiment, only specified time can be used as a triggering condition. Scheduling Information can also include information that describes the type of network information to discover from the target network, such as only network topology information, all network information available, or only network information that has changed from a specified previous state of network information. In the implemented embodiment, the type of network information to discover is limited to all network information available or only network information that has changed from a specified previous state of network information. Those skilled in the art will appreciate that the discovery information transmitted to the discovery component can vary, including a subset of the described information, or additional information not explicitly described.

In the preferred embodiment of the invention, the discovery information sent to the discovery component is directed to scheduler 520. If Scheduling Information is received by scheduler 520, scheduler 520 creates at least one discovery action that specifies how the discovering of the target network will take place. All created discovery actions are sent to the action queue and monitor 522. The action queue and monitor 522 stores discovery actions until an action is ready to be undertaken, at which time the action is sent to the importer 526. Typically, the discovery action will have triggering information which is monitored by the action queue and monitor 522 and the satisfaction of the triggering information prompts the transmittal of the action to the importer 526. If target node name information or Node Connection Information is received by scheduler 520, scheduler 520 sends this information to discovery configuration database 524. The discovery configuration database 524 includes information which enables the discovery component to accomplish its discovery of target network information, such as target node addresses, passwords, etc. as described earlier.

Upon receipt of a discovery action, importer 526 sends a request to discovery configuration database 524 for Node Connection Information for the target node which corresponds to the received discovery action. The discovery configuration database 524 responds by sending the requested Node Connection Information to importer 526, which will include the most recent previously stored generation ID for the target node and target network if such a generation ID exists. Importer 526 then initiates a communication with the network management information service subcomponent on the specified target node (here NXIS server node 512). This communication requests the target network information specified by the scheduling information of the discovery action. The network management information service then sends this requested target network information (here NXIS information) to the importer 526, including in the sent information a generation ID as described earlier that corresponds to the state of the network information. Importer 526 then sends the received generation ID to the discovery configuration database 524 and sends the received target network information to temporary storage 510. Finally, importer 526 sends a communication to parser/translator 530 that indicates that network information has been received by the importer 526. Typically, this communication will indicate the location of the temporarily stored target network information.

Those skilled in the art will appreciate that it is possible for communications to be lost or to contain an error which prevents the communication from being understood, that a receiver of a communication may be unable or unwilling to respond, and that the receiver of a request communication may not have access to the information requested. If a response communication is not received, then further actions which require information expected in the response will not be carried out until such information is available. In addition, those skilled in the art will appreciate that NXIS server node 512 can be any target node with which node 110 can communicate, and which has a network management information service subcomponent. Typically, the discovery component will communicate with multiple target nodes as network information is discovered for multiple target networks, but only one example target node is shown in FIG. 5 for purposes of illustrating the information flow between a discovery component and a target node.

At some point after receiving a communication from importer 526 that indicates network information has been received, parser/translator 530 sends a communication to temporary storage 510 requesting the stored network information (here NXIS information). After receiving the communication from importer 526, temporary storage 510 had stored the network information, and after receiving the request communication from parser/translator 530, temporary storage 510 sends the requested network information to parser/translator 530. Typically, temporary storage 510 will remove the network information from storage after it is send to parser/translator 530. Those skilled in the art will appreciate that it is possible that importer 526 could send multiple request communications for network information and receive multiple response communications, from one or more target nodes, before the network information from the first request communication is sent to parser/translator 530. To prevent the loss or destruction of received network information, it is possible for importer 526 to send network information received from each response communication to different temporary storage, or it is possible for temporary storage 510 to receive all network information and maintain a correspondence between stored network information and received communication by importer 526.

After receiving the stored network information from temporary storage 510, parser/translator 530 separates the network information into separate transactions. Each transaction corresponds to a single logical abstraction of network information from the target network. Each transaction may have multiple statements and may refer to multiple network entities on the target network. These entities can represent various network information, including the following: network nodes, components of network nodes, groups of nodes, network services, network event and alarm information, etc. For example, NXIS typically refers to its network entities as objects, and assigns an NXIS object ID to each NXIS object. A single IPX node may have multiple NXIS objects, such as for an Ethernet card, a print service, etc. In this case, the discovery component will typically aggregate these multiple NXIS objects into a single discovery node object that corresponds to the entire IPX node. Parser/translator 530 then sends multiple communications to object modeler and updater 528 such that each communication includes a transaction from the network information.

Object modeler and updater 528 receives communications from parser/translator 530, and models each network information transaction in software with a logical object. In the example embodiment, object modeler and updater 528 models each NXIS transaction with a SunNet Manager (SNM) software object. Software objects are well known in the prior art, and those skilled in the art will appreciate that such objects typically are of a specific type that corresponds to a particular class type in a hierarchy of class types. Additionally, such objects typically include data structures that hold information related to the object, typically include methods that perform actions on the object, typically derive data structures and methods from the class type to which they correspond, and typically inherit some methods and some data structures from other class types that are above the particular class type in the class hierarchy. Since the objects correspond to a particular class type in a class hierarchy, the object modeler and updater 528 will typically have access to at least one previously created class hierarchy such that the class types correspond to abstract network entities for the target network. In the preferred embodiment, the class hierarchy will include class types which are specific to the network protocol of the target network, and the type of the created abstract object will indicate the network protocol of the network to which the object corresponds. Those skilled in the art will appreciate that the construction of a class hierarchy used to model information can be a difficult task, but that the use of such objects and object-oriented programming techniques provides many benefits over more traditional programming techniques, including advantages such as data encapsulation, polymorphism, and inheritance of methods and structure. In addition, those skilled in the art will appreciate that object-oriented programming systems can vary in the representations and functionalities available in the system.

The object modeler and updater 528 will maintain a correspondence between the created discovery node objects and the one or more target network entities to which the created object corresponds. To accomplish the modeling of the transaction information, the object modeler and updater 528 will identify any network entities which are referenced in a transaction. It will then determine if a discovery node object already exists which corresponds to the target network entities referenced in the transaction. If a discovery node object does exist, the object modeler and updater 528 will send a communication which requests the object to the discovery node object database (here SNM object database 534). If a discovery node object does not exist, the object modeler and updater 528 will create a new discovery node object which corresponds to the network entities in the current transaction, and will store the correspondence between the new object and the network entities. The types of network entities and other transaction information will determine the type of discovery node object created. After the object modeler and updater 528 has a discovery object that corresponds to the current transaction, either a newly created object or an object received from the object database in response to a request communication, the object modeler and updater 528 will update the object by storing the information from the transaction in the data structures of the object. Finally, the object modeler and updater 528 will send a communication to the object database which includes the updated object.

If the object database (here SNM Object Database 534) receives a request communication from the object modeler and updater 528 for a particular object, the object database will respond with a communication to the object modeler and updater 528 that includes the requested object. When the object database receives a communication from the object modeler and updater 528 that includes an object, the object database will store the object, regardless of whether the object is new or an updated version of a previously stored object. If any changes occur to the data stored in the object database, the object database will send a communication to the displayer 536 which includes the changes in the data.

If the displayer 536 receives a communication from the object database that includes changes in object data, the displayer 536 will send a communication to the display 112 that includes updated display information that reflects the updated state of the object database. Those skilled in the art will appreciate that the displayer may actually communicate with an intermediate component, such as an executing application program in the main memory 116, and this intermediate component may communicate with the display 112. In addition, those skilled in the art will appreciate that while it is not illustrated in FIG. 5, a user may interact with the displayer 536 or an intermediate component to modify the display information, or to make changes to the discovery component subcomponents such as the object database, discovery configuration database 524, action queue and monitor 522, etc. In the example embodiment of FIG. 1, the SunNet Manager Console 101 can act as an intermediate component and facilitate the management of network information by a user who invokes network management functionality. As well as displaying network information, an intermediate component such as the SunNet Manager Console may allow the user to send communications to contactable nodes and alter the status of nodes, including the network services offered by the nodes. Such an intermediate component could also act as an intermediary between the user and the discovery component for the purposes of entering discovery information that the discovery component will use to discover network information for target networks. Those skilled in the art will appreciate that displayer 536 or an intermediate component could communicate with a display and a user on another node instead of, or in addition to, node 110.

The following references to FIGS. 6–11 will describe the processing flow for the preferred embodiment, using as an example an IPX discovery component on an IP node that is discovering network information from a target IPX network. Those skilled in the art will appreciate that the processing flow is not limited to the discovery of network information for IPX networks, nor is the processing flow limited to discovery by a discovery node on an IP network.

Figure 6:
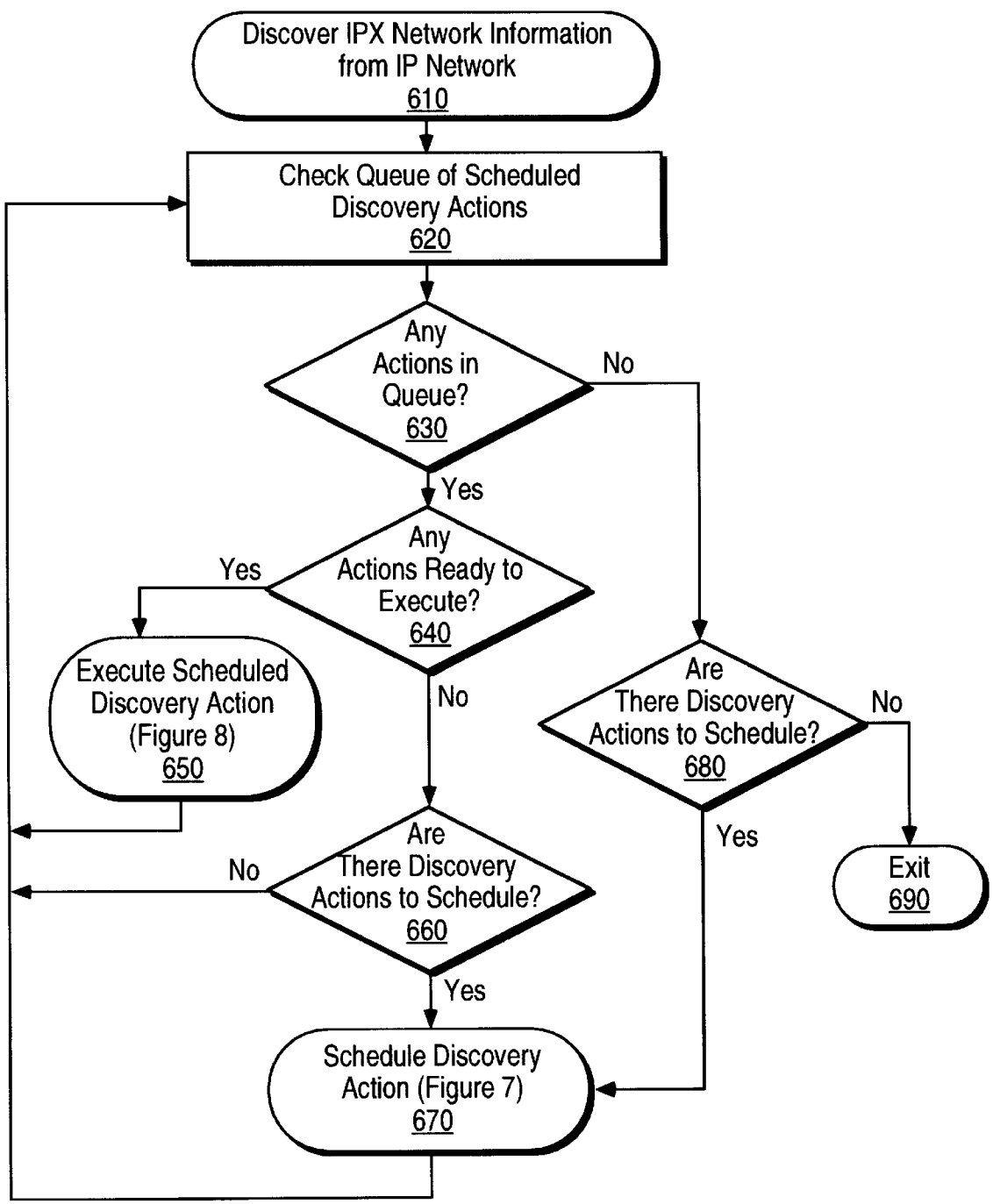
FIG. 6 illustrates a flow diagram for the Discover IPX Network Information From IP Network process in accordance with the present invention.

FIG. 6 illustrates the general flow diagram for the Discover IPX Network Information from IP Network Routine 610. The 610 routine begins at step 620 by checking a queue of scheduled discovery actions. Discovery actions specify information about how to discover target network information, including when the action should be executed. After checking the queue, a determination is made at step 630 whether any discovery actions are currently in the queue. If there are discovery actions in the queue, then the routine proceeds to determine in step 640 if any of the actions in the queue are ready to be executed. If so, the routine proceeds to the Execute Scheduled Discovery Action Subroutine in step 650, which is described further with respect to FIG. 8, and executes the subroutine. After execution of the subroutine in step 650, the routine proceeds to return to step 620 to check the discovery action queue.

If none of the actions in the queue are ready to be executed at step 640, the routine proceeds to step 660 to determine if there are additional discovery actions to schedule. Those skilled in the art will appreciate that these additional discovery actions could be new actions, or reschedules of previously created actions. If there are not additional discovery actions to schedule, the routine proceeds to return to step 620 to check the discovery action queue. If there are additional discovery actions to schedule, the routine proceeds to the Schedule Discovery Action Subroutine in step 670, which is described further with respect to FIG. 7, and executes the subroutine. After execution of the subroutine in step 670, the routine proceeds to return to step 620 to check the discovery action queue. If there are not any actions in the queue in step 630, then a determination is made at step 680 whether there are any additional discovery actions to be scheduled and added to the action queue. If there are not any discovery actions to schedule, then the routine exits at step 690. Those skilled in the art will appreciate that the 610 routine can later be reinvoked on a periodic basis or if there are additional discovery actions to schedule or execute. If there are discovery actions to schedule in step 680, the routine proceeds to the Schedule Discovery Action Subroutine in step 670 and executes the subroutine, and then rejoins the flow of the routine which is described above.

Figure 7:
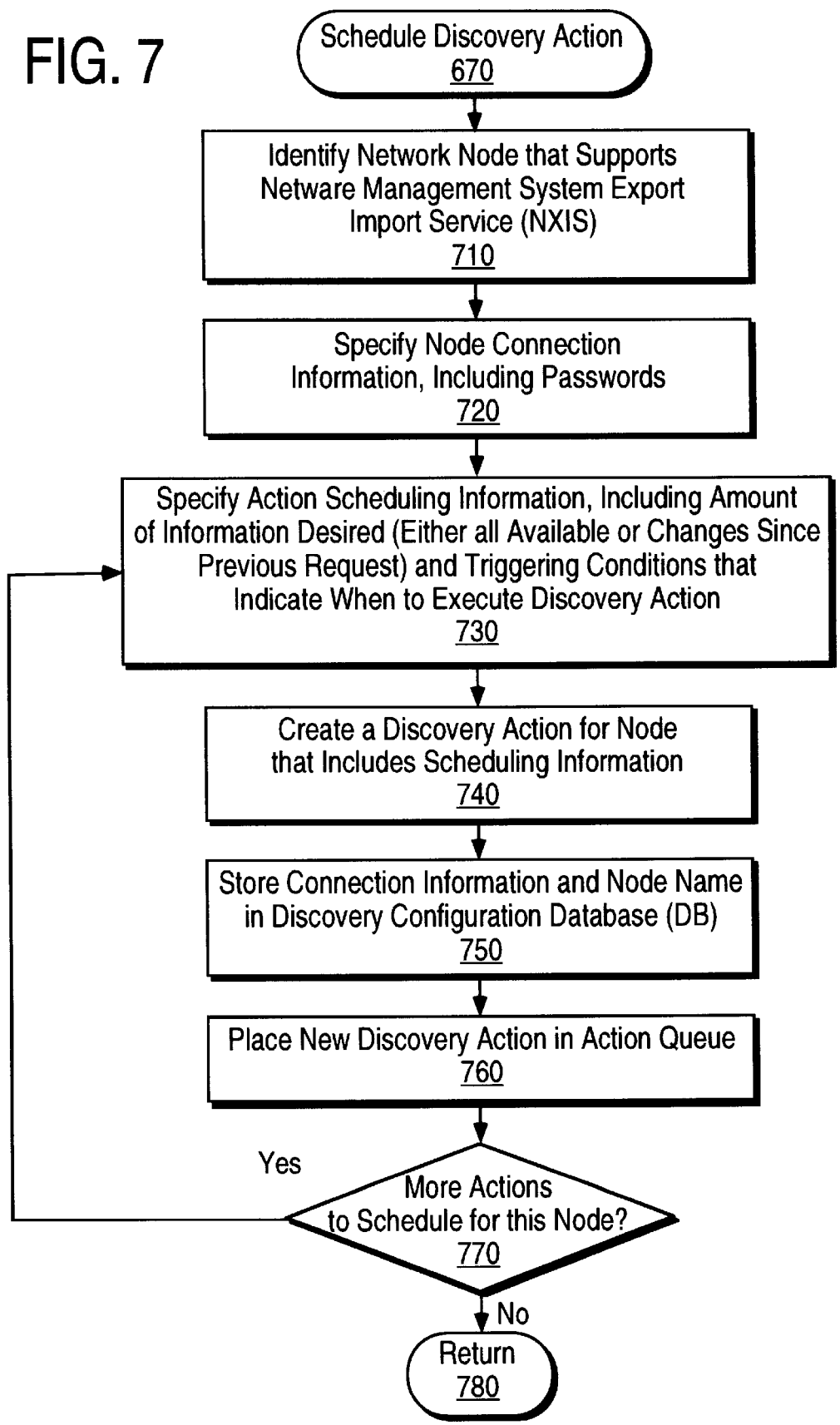
FIG. 7 illustrates a flow diagram for the Schedule Discovery Action process in accordance with the present invention.

Referring now to FIG. 7, the general flow diagram for the Schedule Discovery Action Subroutine 670 is described. The scheduling of a discovery action begins at step 710 by identifying a target node from which to discover network information for the target network. In the preferred embodiment, the target node will typically be a network node that supports a network management information service, such as NetWare Management System Export Import Service (NXIS). The subroutine proceeds to step 720 where node connection information for the target node is specified. This node connection information typically includes the network address of the target node, or information which allows the identification of the target node such that the discovery node can initiate communication with the target node. Those skilled in the art will appreciate that if discovery actions have already been conducted for this target node and the node connection information for the target node is already stored and accessible to the discovery node, then it may not be necessary to provide node connection information for the scheduling of a discovery action. The node connection information also typically includes information that allows the sharing of data between the discovery node and the target node and its network management information service after communication is established. This information can include information such as passwords, computer port numbers, public or private encryption keys, etc.

After specifying node connection information, the subroutine proceeds to step 730 where action scheduling information is specified. The action scheduling information typically includes a description of the type of network information desired and triggering conditions which indicate when to execute the discovery action. The network information desired may include all network information available, only network information that has changed since some previous state of network information, only network information on network services available, etc. The triggering conditions can indicate a variety of conditions including the execution of the discovery action immediately or as soon as possible, the execution of the discovery action at some future specified time or at specified intervals, the execution of the discovery action when some physical condition occurs such as when the load on the CPU drops below a certain amount or when a database or file system has a certain amount of space available, etc. Those skilled in the art will appreciate that alternate embodiments may offer different options for specifying action scheduling information, including variations on the types of network information desired.

After specifying action scheduling information, the subroutine proceeds to step 740 where a discovery action is created. The discovery action will typically have access to its scheduling information, as well as the name or identifier of the target node which corresponds to the action. Those skilled in the art will appreciate that a discovery action could be implemented in many ways, including a data structure, a textual entry in a list, a software object, etc. After the discovery action is created, the subroutine proceeds to step 750 where the node connection information and node name for the target node are stored in the discovery configuration database. Once stored, this information will be accessible by other subcomponents. After the target node information is stored, the subroutine proceeds to step 760 where the newly created discovery action is placed on the Action Queue and Monitor. Discovery actions remain on the queue until they are ready to be executed. Those skilled in the art will appreciate that the action queue and monitor could be implemented in a variety of ways, including elements in a list that are periodically polled, software objects that monitor their own conditions and notify another subcomponent when they are ready to be executed, etc. Those skilled in the art will also appreciate that some steps in the subroutine are independent of other steps, and the order of execution can be varied. For example, step 750 could occur before step 730, or after 760. Additionally, if a parallel processing system is in use, step 750 could occur in parallel with steps 740 or 760. After the new discovery action is placed on the action queue, the subroutine proceeds to step 770 where a determination is made whether there are more actions to schedule for the target node identified in step 710. If there are more actions to schedule, then the subroutine returns to specifying action scheduling information in step 730, and rejoins the flow of the subroutine which is described earlier. If there are not more actions to schedule, then the subroutine proceeds to step 780, which ends the subroutine and returns to the flow from which the subroutine was executed.

Figure 8:
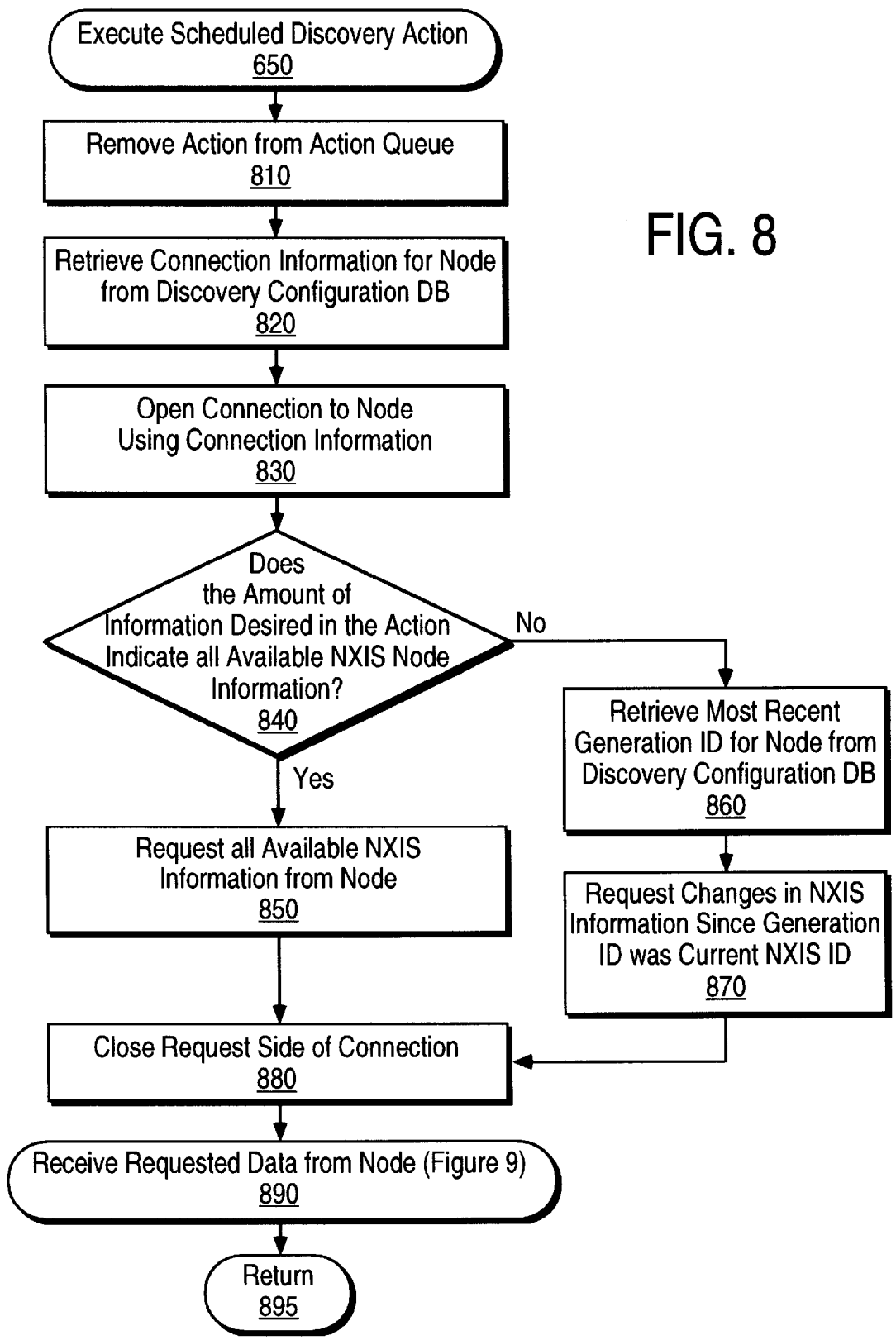
FIG. 8 illustrates a flow diagram for the Execute Scheduled Discovery Action process in accordance with the present invention.

Referring now to FIG. 8, the general flow diagram for the Execute Scheduled Discovery Action Subroutine 650 is described. The execution of a discovery action begins at step 810 where a scheduled discovery action that is ready to be executed is removed from the Action Queue and Monitor. After the action is removed, the subroutine proceeds to step 820 where the connection information for the target node is retrieved from the discovery configuration database. The subroutine then proceeds to step 830, where the discovery node uses the target node connection information to begin a communication to the target node. In the preferred embodiment, this is accomplished by opening a two-way connection between the discovery node and the target node. The subroutine next determines in step 840 the amount of information desired by the discovery node for this discovery action. If the amount of information is not all of the information available from the target node, but rather only the changed information from some previous state of the network information, then the subroutine proceeds to step 860 where the most recent generation ID for network information from this target node is retrieved from the discovery configuration database. After retrieving the generation ID, the subroutine proceeds to step 870 where the discovery node makes a request to the target node for network information of the type specified, particularly that which has changed since the state of target network information corresponded to the retrieved generation ID. The subroutine then proceeds to step 880 where the discovery node sends the communication, and closes its side of the connection. If, on the other hand, it was determined in step 840 that all available network information was desired, then the subroutine would proceed to step 850, where the discovery node requests from the target node all network information of the type specified, including the possibility of all information available. The subroutine then proceeds to step 880 where the discovery node sends the communication, and closes its side of the connection.

Those skilled in the art will appreciate that there are various ways that the desired network information could be obtained other than requesting it from a network management information service such as NXIS at the target node, including the following: the discovery node could retrieve previously stored network protocol discovery mechanisms that are specific to the target network, and execute these mechanisms at the target node to discover the desired network information directly from the target network; the discovery node could access a database of stored target network information that was present on the target node or a node on the target network; the discovery node could execute a function at the target node that would request the desired target network information from another node on the target network; etc. After the communication has been sent and the discovery node side of the connection has been closed in step 880, the subroutine proceeds to the Receive Requested Data from Node Subroutine in step 890 and executes the subroutine, to be described below with respect to FIG. 9, and then rejoins the flow of the current subroutine. After executing the subroutine in step 890, the current subroutine proceeds to step 895, which ends the current subroutine and returns to the flow from which the current subroutine was executed.

Figure 9:
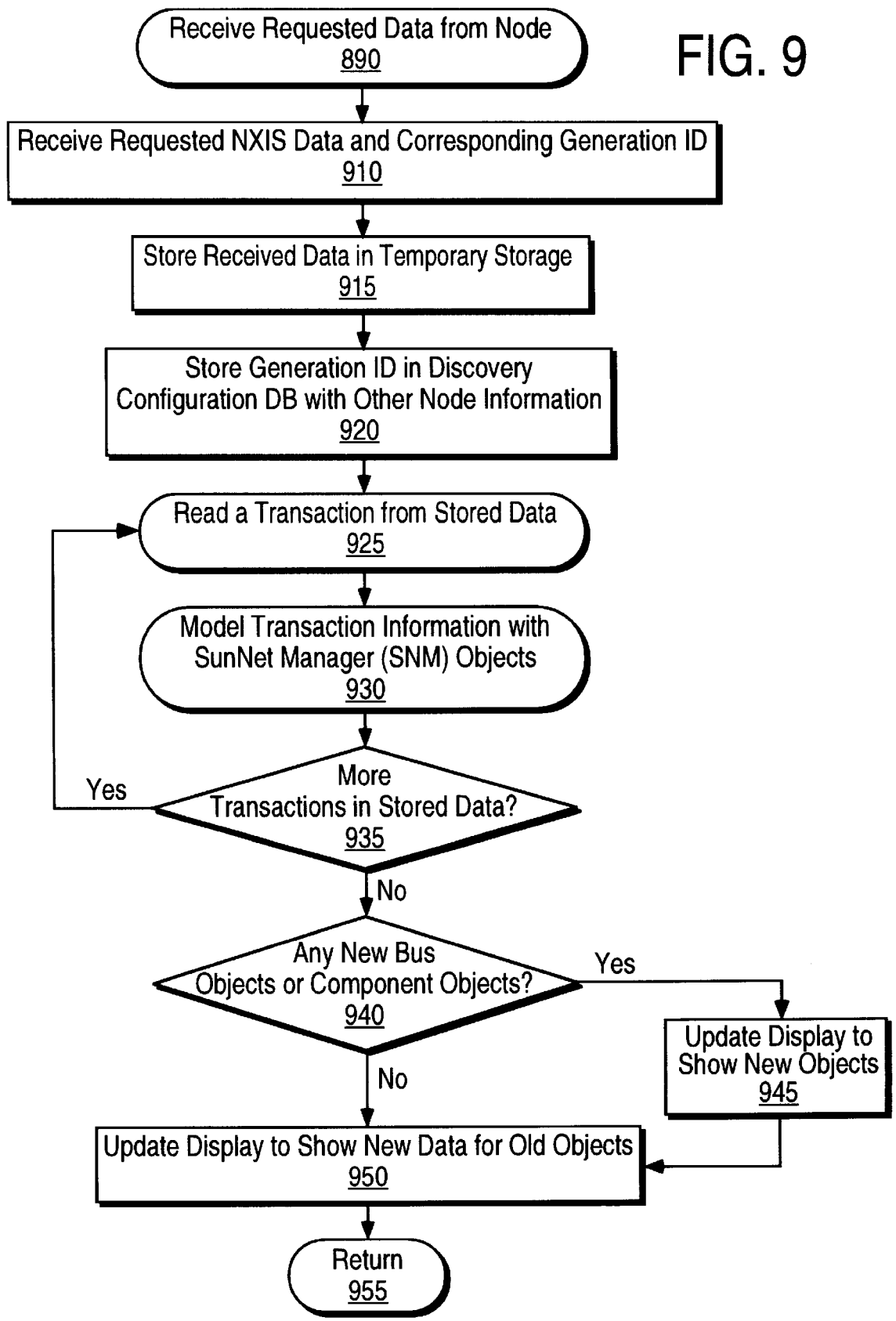
FIG. 9 illustrates a flow diagram for the Receive Requested Data From Node process in accordance with the present invention.

Referring now to FIG. 9, the general flow diagram for the Receive Requested Data from Node Subroutine 890 is described. The receipt of requested target network information data begins at step 910 where the discovery node receives a communication from the target node that includes the requested network information and a generation ID that corresponds to this information. The subroutine proceeds to step 915 where the received network information is stored in temporary storage at the discovery node. The subroutine then proceeds to step 920 where the generation ID that was received is stored with other information related to the target node and target network in the discovery configuration database. This generation ID will be used later if changes are requested that have occurred since this state of the target network information. The subroutine next proceeds to the Read a Transaction from Stored Data Subroutine in step 925, which is described further with respect to FIG. 10, and executes the subroutine. This subroutine will read a transaction from the stored target network information. After execution of the subroutine in step 925, the current subroutine proceeds to the Model Transaction Information with SunNet Manager Objects Subroutine in step 930, which is described further with respect to FIG. 11, and executes the subroutine. This subroutine will model the transaction information into a representation of target network information that is used by the discovery node.

After execution of the subroutine in step 930, the current subroutine proceeds to step 935 and determines whether there are more transactions in the stored data. If so, the current subroutine returns to step 925 to read the next transaction, and rejoins the flow of the current subroutine as described above. If not, the current subroutine proceeds to step 940 and determines if new target network information has been added to the discovery node's object representation of accessible network information. In the preferred embodiment, if new objects of a specified type have been created, the subroutine proceeds to step 945 to update the display to show these new objects. In the example embodiment, SNM bus objects components objects and view objects are objects of the specified type. The subroutine then proceeds to step 950 to update the display to reflect new information that has changed in previously existing objects. If no new objects of the specified object types were created, the current subroutine proceeds instead from step 940 directly to step 950 to update the display to reflect new information. Those skilled in the art will appreciate that in other embodiments, different types of objects will be present at the top level of the display, and thus the creation of these object types will prompt the display to be updated. It is also possible that the display will never be automatically updated, and will only change if a user requests the display of new information. After the display is updated, the current subroutine proceeds to step 955, which ends the subroutine and returns to the flow from which the subroutine was executed.

Figure 10:
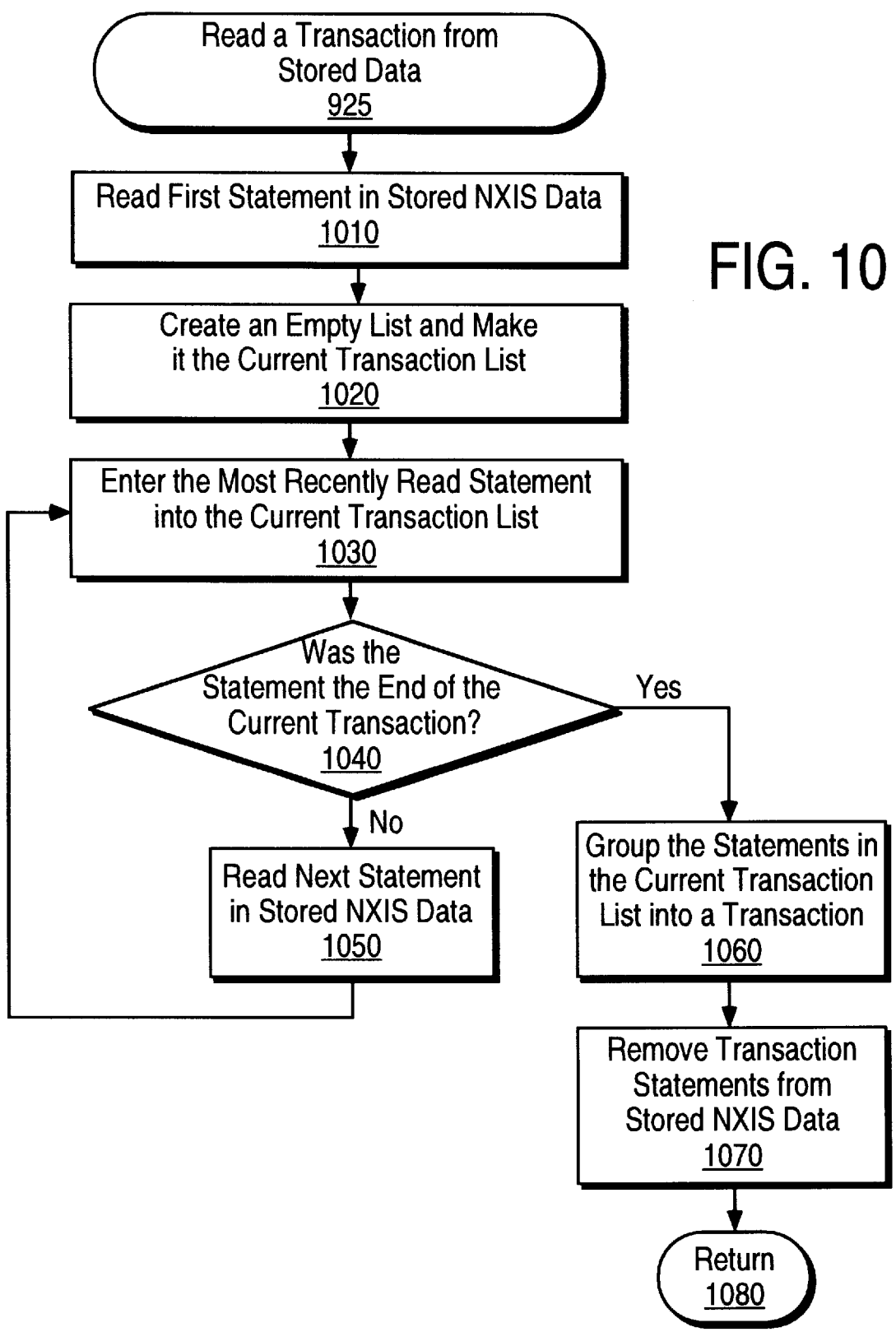
FIG. 10 illustrates a flow diagram for the Read A Transaction From Stored Data process in accordance with the present invention.

Referring now to FIG. 10, the general flow diagram for the Read a Transaction from Stored Data Subroutine 925 is described. The process of reading a transaction begins at step 1010 where the first statement in the stored target network information is read. The current subroutine proceeds to step 1020 where an empty list is created and designated to be the current transaction list. Proceeding to step 1030, the most recently read statement of target network information is entered onto the current transaction list. The current subroutine then proceeds to step 1040 and determines if the most recently read statement was the end of the current transaction in the network information. If it was not, the current subroutine proceeds to step 1050 to read the next statement in the target network information, and then returns to step 1030 and rejoins the flow of the current subroutine as described above. If the most recently read statement was the end of the current transaction, the current subroutine proceeds to step 1060 where all of the statements on the current transaction list are grouped together and the group is designated to be the current transaction. The subroutine then proceeds to step 1070 to remove the statements in the current transaction from the stored target network information from which they were read. Those skilled in the art will appreciate that other equivalent processes can be used to read the statements of a specific transaction and group them together. After removing the statements in step 1070, the current subroutine proceeds to step 1080, which ends the subroutine and returns to the flow from which the subroutine was executed.

Figure 11:
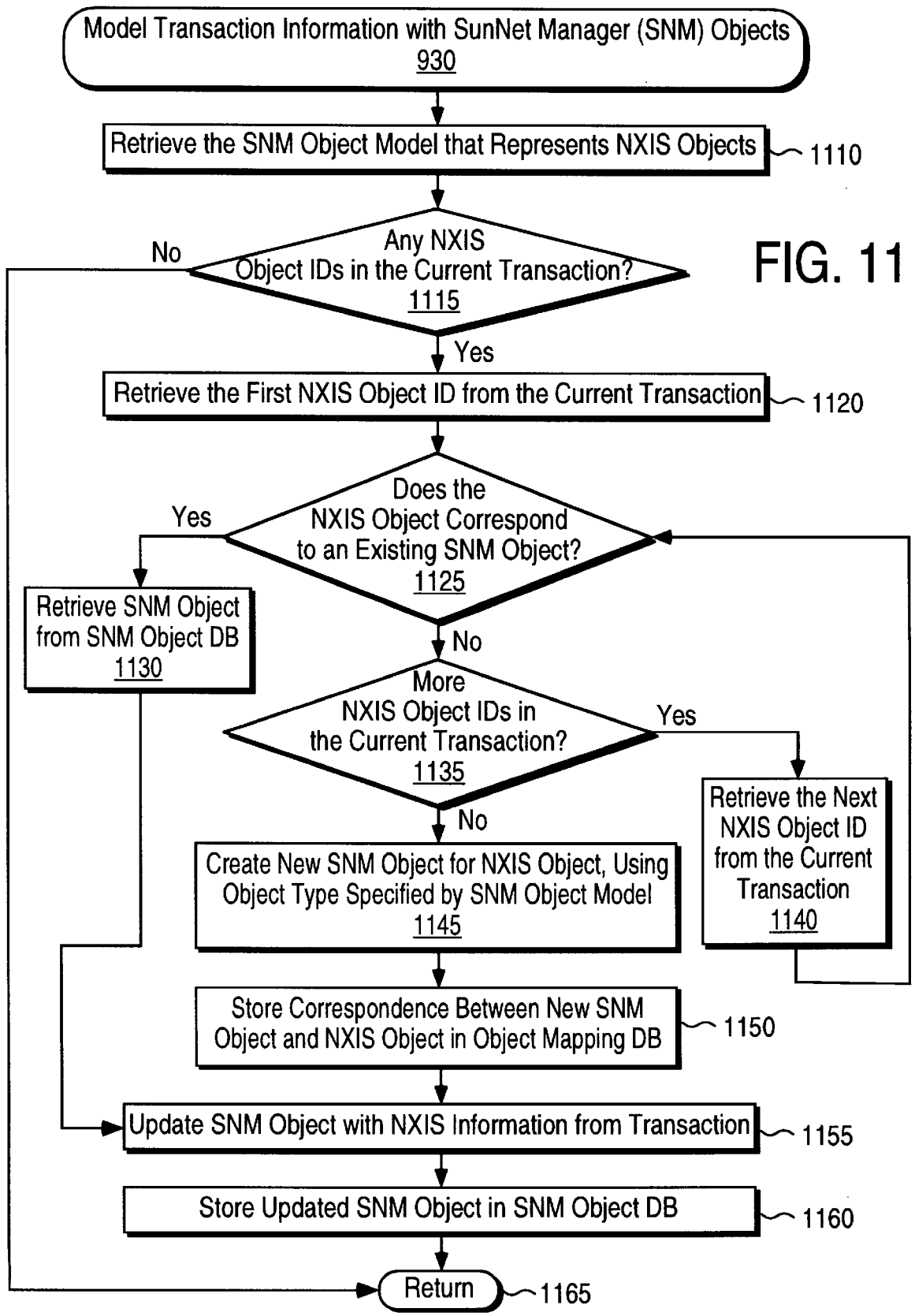
FIG. 11 illustrates a flow diagram for the Model Transaction Information With SunNet™ Manager (SNM) Objects process in accordance with the present invention.

Referring now to FIG. 11, the general flow diagram for the Model Transaction Information with SunNet Manager Objects Subroutine 930 is described. The process of modeling transaction information begins at step 1110 where a previously created object model is retrieved that represents the possible types of objects which can correspond to the network information in the transaction. In the preferred embodiment, as described above, a class hierarchy which is specific to the network protocol of the target network will be used as a model. In the example embodiment, the objects that are created will be SNM objects. The current subroutine then proceeds to step 1115 where a determination is made whether any target network entities are referenced in the current transaction. In the example embodiment, NXIS object IDs will be sought in NXIS network information from the target node. Each target network entity could be treated as a separate target network node, or multiple network entities could exist for a single target network node. If there are no network entities referenced, the subroutine will proceed to step 1165, which ends the subroutine and returns to the flow from which the subroutine was executed. If there are network entities referenced in the current transaction, however, the current subroutine will proceed to step 1120 to retrieve the first reference to a target network entity from the information in the current transaction. The current subroutine will then proceed to step 1125 to determine if the retrieved target network entity corresponds to an existing discovery node object.

If it does not correspond in step 1125, the current subroutine will proceed to step 1145 to create a new discovery node software object that corresponds to the target network entity or entities and the other target network information in the current transaction. The new object will be of a type specified by the object model previously retrieved in step 1110. After the object is created, the correspondence between the newly created discovery node object and the target network entities in the current transaction will be stored in an object mapping database in step 1150. The current subroutine will proceed to step 1135 to determine if there are more references to target network entities in the current transaction information. If there are more references, the current subroutine will proceed to step 1140 to retrieve the next reference to a target network object from the information in the current transaction, and then proceed to step 1125 and rejoin the flow of the current subroutine as described above. If the retrieved target network entity does correspond to an existing discovery node object in step 1125, the current subroutine proceeds to step 1130 and retrieves the existing object from the discovery node object database. The current subroutine then proceeds to step 1135, and rejoins the flow of the current subroutine as described above.

If there are not more references to target network objects in step 1135, the current subroutine will proceed to step 1155 to update the retrieved and created discovery node objects with network information in the current transaction. Proceeding to step 1160 after the discovery node objects are updated, the updated discovery node objects will be stored in the discovery node object database, which will be the SNM object database in the example embodiment. Finally, after the objects are stored in step 1160, the current subroutine proceeds to step 1165, which ends the subroutine and returns to the flow from which the subroutine was executed.

There has thus been described a method, apparatus and computer system for discovering the nodes and other network information of a target computer network, from a discovery node that is not part of that network, particularly when the discovery node uses a different network protocol than the target network. The discovery of the target network information involves one or more target nodes that have access to network information about the target network, and with whom the discovery node can communicate. Although the present invention has been described in terms of preferred, implemented and example embodiments, this is by way of illustration only. Accordingly, the scope of the present invention should be determined in light of the claims which follow.

We claim:

1. A computer-implemented method for discovering information about a first computer network having a plurality of nodes, from a device remote from said first network, wherein said first network uses a first network protocol and said remote device uses a second network protocol different from said first network protocol, said method comprising the steps of:
   a) identifying a node with which the remote device can communicate wherein said identified node has access to information about the first network,
   b) at the remote device, receiving information about the first network from the identified node wherein said received first network information includes node connection information and node type information for a plurality of first network nodes;
   c) at the remote device, retrieving an object model including object type definitions wherein said type definitions are remote device representations of node types for nodes using the first network protocol;
   d) at the remote device, creating a plurality of objects representing the received first network information such that each object has a type specified by the retrieved object model; and
   e) using the created objects to identify first network nodes accessible from the remote device.

2. The method of claim 1 wherein:
   the remote device and the identified node are nodes on a second computer network;
   communication between the identified node and the remote device uses the second network protocol; and
   the created objects are used to identify first network nodes accessible from the second network.

3. The method of claim 1 wherein the first network information received from the identified node includes node topology and network service information for the first network.

4. The method of claim 1 wherein each created object is a logical representation of node connection and type information for a plurality of first network nodes.

5. The method of claim 1 wherein between steps a) and b) the remote device contacts the identified node and specifies a function to be executed by a first network node, and wherein the first network information received in step b) is in response to said executed function.

6. The method of claim 1 wherein the identified node is a first network node and the received first network information is in response to a first communication from the remote device to the identified node requesting that the identified node transmit first network information to the remote device.

7. The method of claim 6, comprising the further steps of:
   f) receiving additional first network information from the identified node to identify changes from previously received first network information; and
   g) modifying the created objects to reflect identified changes.

8. The method of claim 7 wherein the additional information is received in response to a second communication from the remote device to the identified node specifying a first time and a second time later than said first time, and wherein said second communication requests that the identified node transmit information at a time later than said second time, said transmitted information to include differences in first network information between said first and second time.

9. The method of claim 7 wherein the additional information is received in response to a second communication transmitted from the remote device to the identified node such that said transmittal requires the satisfaction of at least one condition previously specified at the remote device.

10. The method of claim 7 wherein the additional information includes network status information in the form of network event information and node event information.

11. The method of claim 7 wherein the first network protocol is an IPX network protocol and the identified node provides first network information by using IPX network functionality to collect network information and transmit the collected information to remote devices.

12. The method of claim 7 wherein the second network protocol is an IP network protocol, and the first network protocol does not have the capability to respond to IP network protocol requests for network information.

13. The method of claim 7 wherein the first network is managed from the remote device by using objects representing received first network information to provide functionality to second network nodes, said functionality including first network services and connectivity to first network nodes.

14. An apparatus for discovering information about a first computer network having a plurality of nodes, the apparatus being remotely located from the first network, wherein said first network uses a first network protocol and said apparatus uses a second network protocol different from said first network protocol, said apparatus comprising:
   an input component that receives identification of a node such that the apparatus can communicate with said identified node, and scheduling information specifying first network information to be discovered;
   a scheduler that creates at least one discovery action corresponding to the identified node and received scheduling information;
   an action executer that executes a created discovery action in accordance with the scheduling information corresponding thereto such that the identified node corresponding to the discovery action is contacted using the second network protocol and a transmittal of the specified first network information to the apparatus is arranged;

an importer that receives first network information from the identified node; and an object modeler that models received first network information and uses modeled information to determine nodes accessible to the apparatus.

15. The apparatus of claim 14 wherein the received scheduling information further specifies conditions under which a corresponding discovery action is to be executed and wherein the apparatus further comprises:

an action monitor that determines when specified conditions of the scheduling information corresponding to the created discovery action are satisfied and notifies the action executer of said determination.

16. The apparatus of claim 14 wherein arrangement of a transmittal of specified first network information during execution of a discovery action is accomplished by requesting that the identified node corresponding to the discovery action transmit the specified first network information.

17. The apparatus of claim 14 wherein arrangement of a transmittal of specified first network information during execution of a discovery action is accomplished by executing a function specific to the first network protocol on the identified node corresponding to the discovery action.

18. The apparatus of claim 14 wherein modeling received first network information involves creating a plurality of objects such that each object has a type specified by a stored object model and said created objects are logical representations of received information for a plurality of first network nodes, and wherein said object model includes object type definitions which represent first network information and are specific to the first network protocol.

19. The apparatus of claim 18 wherein the apparatus further comprises:

an object presenter that uses created objects to determine nodes accessible from the apparatus.

20. A computer system for discovering information about a first computer network having a plurality of nodes, the system being remotely located from the first network, wherein said first network uses a first network protocol and said computer system uses a second network protocol different from said first network protocol, said computer system comprising:

an input component that receives identification of a node such that the computer system can communicate with said identified node, and scheduling information specifying first network information to be discovered;

a scheduler that creates at least one discovery action corresponding to the identified node and received scheduling information;

an action executer that executes a created discovery action in accordance with the scheduling information corresponding thereto such that the identified node corresponding to the discovery action is contacted using the second network protocol and a transmittal of the specified first network information to the computer system is arranged;

an importer that receives first network information from the identified node, including node connection information and node type information for a plurality of first network nodes; and an object modeler that models received first network information by creating a plurality of objects that represent the received first network information, and uses created objects to identify nodes accessible to the computer system.

21. The computer system of claim 20 wherein:

the computer system is a node on a second computer network;

communication between the identified node and the computer system uses the second network protocol;

each created object is a logical representation of node connection and type information for a plurality of first network nodes; and the logical representations are nodes identified to be accessible from the second computer network.

22. The computer system of claim 21 wherein:

the first network protocol is IPX;

the second network protocol is IP;

the first network does not have the capability to respond to IP network protocol requests for first network information; and the identified node provides first network information by using IPX network functionality to collect network information and transmit the collected information to remote devices.

23. An article of manufacture comprising a computer-readable medium and a computer program embodied therein, for discovering information about a first computer network having a plurality of nodes, the computer-readable medium located remotely from the first network, wherein said first network uses a first network protocol and said computer program uses a second network protocol different from said first network protocol, said computer program comprising:

an input functionality that receives identification of a node such that the computer program can communicate with said identified node, and scheduling information specifying first network information to be discovered and conditions under which the discovery of first network information is to be accomplished;

a schedule functionality that creates at least one discovery action corresponding to the identified node and received scheduling information;

an execute functionality that executes a created discovery action in accordance with the scheduling information corresponding thereto such that the identified node corresponding to the discovery action is contacted using the second network protocol and a transmittal of the specified first network information to the computer program is arranged;

an import functionality that receives first network information originating from the identified node; and an object modeling functionality that models received first network information and uses modeled information to determine nodes accessible to the computer program.

24. The article of manufacture of claim 23 wherein arrangement of a transmittal of specified first network information during execution of a discovery action is accomplished by requesting that the identified node corresponding to the discovery action transmit the specified first network information.

25. The article of manufacture of claim 23 wherein:

modeling of received first network information involves creating a plurality of objects such that each created object has a type specified in a stored object model;

the object model includes object type definitions specific to the first network protocol;

the created objects represent received first network information; and each created object is a logical representation of received first network information for a plurality of first network nodes.

* * * * *